United States Patent
Bruce

(10) Patent No.: US 11,882,777 B2
(45) Date of Patent: Jan. 30, 2024

(54) AGRICULTURAL SWEEP WITH WEAR RESISTANT COATING

(71) Applicant: Osmundson Mfg. Co., Perry, IA (US)

(72) Inventor: Douglas G Bruce, West Des Moines, IA (US)

(73) Assignee: OSMUNDSON MFG. CO., Perry, IA (US)

( * ) Notice: Subject to any disclaimer, the term of this patent is extended or adjusted under 35 U.S.C. 154(b) by 389 days.

(21) Appl. No.: 17/163,625

(22) Filed: Feb. 1, 2021

(65) Prior Publication Data

US 2022/0022356 A1    Jan. 27, 2022

Related U.S. Application Data

(63) Continuation-in-part of application No. 16/934,741, filed on Jul. 21, 2020, now abandoned.

(51) Int. Cl.
 *A01B 15/02* (2006.01)

(52) U.S. Cl.
 CPC .................... *A01B 15/02* (2013.01)

(58) Field of Classification Search
 CPC ........ A01B 15/025; A01B 15/02; A01B 15/04
 See application file for complete search history.

(56) References Cited

U.S. PATENT DOCUMENTS

| | | | |
|---|---|---|---|
| 3,805,423 A | 4/1974 | Engel | |
| 4,011,051 A | 3/1977 | Helton | |
| 4,224,382 A | 9/1980 | Brown | |
| 4,625,810 A | 12/1986 | Edmisson | |
| 5,337,801 A | 8/1994 | Meterkowski | |
| 5,375,350 A | 12/1994 | Maybon | |
| 5,456,323 A * | 10/1995 | Hill | A01B 15/04 172/721 |
| 5,785,109 A | 7/1998 | Hongawa | |
| 5,813,475 A * | 9/1998 | Bergan | A01B 15/02 172/721 |
| 5,852,272 A | 12/1998 | Amano | |
| 5,879,743 A | 3/1999 | Revankar | |
| 6,102,140 A | 8/2000 | Boyce | |
| 6,156,391 A | 12/2000 | Shum | |
| 6,327,970 B1 | 12/2001 | Kooima | |
| 6,382,328 B1 | 5/2002 | Beyer | |
| 6,394,212 B1 | 5/2002 | Takano | |
| 6,446,368 B1 | 9/2002 | Watts | |
| 6,571,889 B2 | 6/2003 | Griffo | |
| 6,649,682 B1 | 11/2003 | Breton | |

(Continued)

*Primary Examiner* — Jamie L McGowan
(74) *Attorney, Agent, or Firm* — DENTONS DAVIS BROWN; Matthew Warner-Blankenship

(57) ABSTRACT

An agricultural device with a wear resistant coating comprising a shank portion that may be attached to an agricultural implement. First and second rear wings connect to an intermediate portion that connects to the shank portion. First and second shoulders are formed at the points where the rear wings meet the intermediate portion, and a patch of wear resistant coating is applied at each of the first and second shoulders. A first edge tapers forwardly from the first rear wing to a point, and a second edge tapers forwardly from the second rear wing to the point. Wear resistant coating may also be applied to the first and second edges or the point. Wear resistant coating may be applied to the agricultural device in a pattern that is specific to soil type.

20 Claims, 14 Drawing Sheets

(56) References Cited

U.S. PATENT DOCUMENTS

| | | |
|---|---|---|
| 6,786,287 B2 | 9/2004 | Pellenc |
| 6,799,385 B2 | 10/2004 | Champney |
| 6,854,808 B2 | 2/2005 | Kostecki |
| 6,857,208 B2 | 2/2005 | Gandhi |
| 6,874,260 B2 | 4/2005 | Mullet |
| 7,017,677 B2 | 3/2006 | Keshavan |
| 7,631,702 B2 | 12/2009 | Hansen |
| 7,650,949 B1 | 1/2010 | Horstman |
| 7,736,117 B2 | 6/2010 | Harshberger |
| 7,836,615 B2 | 11/2010 | Winter |
| 7,850,216 B2 | 12/2010 | Randolph |
| 7,950,170 B2 | 5/2011 | Hall |
| 7,992,371 B2 | 8/2011 | Rieck |
| 8,007,929 B2 | 8/2011 | Itoh |
| 8,122,696 B2 | 2/2012 | Moutton |
| 8,127,451 B1 | 3/2012 | Darst |
| 8,191,287 B2 | 6/2012 | Winter |
| 8,646,192 B2 | 2/2014 | Berton |
| 8,763,282 B2 | 7/2014 | Brufau Guinovart |
| 8,778,459 B2 | 7/2014 | Farmer |
| 8,800,848 B2 | 8/2014 | Michandani |
| 8,875,424 B2 | 11/2014 | Moller |
| 8,959,806 B2 | 2/2015 | Zamorano Jones |
| 9,003,681 B2 | 4/2015 | Simmons |
| 9,009,996 B2 | 4/2015 | Amada |
| 9,038,359 B2 | 5/2015 | Augustine |
| 9,052,394 B2 | 6/2015 | Allouche |
| 9,074,351 B2 | 7/2015 | Ballinger |
| 9,090,041 B2 * | 7/2015 | Balvanz .............. A01B 79/00 |
| 9,380,745 B2 | 7/2016 | Holtmann |
| 9,561,562 B2 | 2/2017 | Churchill |
| 9,644,347 B2 | 5/2017 | Balan |
| 9,699,947 B2 | 7/2017 | Wendte |
| 9,863,119 B2 | 1/2018 | Congdon |
| 9,903,093 B2 | 2/2018 | Wan |
| 9,957,691 B2 | 5/2018 | Congdon |
| 10,125,471 B2 | 11/2018 | Congdon |
| 10,149,421 B2 | 12/2018 | Schott |
| 10,166,634 B2 | 1/2019 | Marchione |
| 10,190,286 B2 | 1/2019 | Konrardy |
| 10,260,207 B2 | 4/2019 | Ley |
| 10,309,159 B2 | 6/2019 | Wright |
| 10,314,221 B2 | 6/2019 | Balvanz |
| 10,329,647 B2 | 6/2019 | Cheney |
| 10,329,734 B2 | 6/2019 | Garcia-Huidobro |
| 10,383,271 B2 | 8/2019 | Hertzog |
| 10,412,871 B2 | 9/2019 | Balvanz |
| 10,422,088 B2 | 9/2019 | Gustavsson |
| 10,455,766 B2 | 10/2019 | Linde |
| 10,455,767 B2 | 10/2019 | Adamczyk |
| 10,543,528 B2 | 1/2020 | Boddapati |
| 2006/0118313 A1 | 6/2006 | Nicholas |
| 2008/0283257 A1 | 11/2008 | Edwards |
| 2010/0037493 A1 | 2/2010 | Kim |
| 2010/0051301 A1 | 3/2010 | Staade |
| 2010/0080982 A1 | 4/2010 | Racek |
| 2012/0317848 A1 | 12/2012 | Calderwood |
| 2013/0266820 A1 | 10/2013 | Kusinski |
| 2014/0014380 A1 | 1/2014 | Budde |
| 2014/0326367 A1 | 11/2014 | Hill |
| 2015/0191899 A1 | 7/2015 | Jones |
| 2015/0196991 A1 | 7/2015 | Montross |
| 2015/0197918 A1 | 7/2015 | Feng |
| 2015/0322644 A1 | 11/2015 | Gillard |
| 2016/0032556 A1 | 2/2016 | Congdon |
| 2016/0113202 A1 | 4/2016 | Mayerle |
| 2016/0153178 A1 | 6/2016 | Amstutz |
| 2017/0014901 A1 | 1/2017 | Powell |
| 2017/0016323 A1 | 1/2017 | Behmlander |
| 2017/0073927 A1 | 3/2017 | Blundell |
| 2017/0254200 A1 | 9/2017 | Sollami |
| 2018/0098479 A1 | 4/2018 | Groves |
| 2018/0223435 A1 | 8/2018 | Johnson |
| 2018/0235137 A1 | 8/2018 | Seifried |
| 2018/0242506 A1 | 8/2018 | Bourgault |
| 2018/0250681 A1 | 9/2018 | Rossiter |
| 2018/0258618 A1 | 9/2018 | Kraemer |
| 2019/0169822 A1 | 6/2019 | Montross |
| 2019/0177954 A1 | 6/2019 | Congdon |
| 2019/0186108 A1 | 6/2019 | Tsukamoto |
| 2019/0218653 A1 | 7/2019 | Bell |
| 2019/0226182 A1 | 7/2019 | Magne |
| 2019/0230838 A1 | 8/2019 | Baernthalaer |
| 2019/0239420 A1 | 8/2019 | Pfitzner |
| 2019/0345688 A1 | 11/2019 | Crowther |

\* cited by examiner

AGRICULTURAL SWEEP WITH WEAR RESISTANT COATING

CROSS-REFERENCE TO RELATED APPLICATIONS

This application is a continuation in part of U.S. application Ser. No. 16/934,741 which was filed on Jul. 21, 2020, the entirety of which is incorporated herein fully by reference.

FIELD OF THE DISCLOSURE

This disclosure relates generally to an agricultural device with a wear resistant coating, and in particular to an agricultural sweep with a wear resistant coating. In one arrangement, the disclosure relates to an agricultural sweep having a patch of wear resistant coating applied to the leading edge of the agricultural sweep. In other arrangements, patches of wear resistant coating may be applied in patterns that are specific to soil type.

BACKGROUND OF THE DISCLOSURE

Various tillage devices are used to turn and work soil for agricultural purposes. One type of tillage device is a sweep. An agricultural sweep is typically mounted to a gang implement which holds a number of sweeps at a position in which the sweeps travel just below the surface of the earth between crop rows. The purpose of the sweeps is to cut weeds just below the ground surface, thus inhibiting the growth of the weeds and promoting the growth of the row crops.

Various designs for agricultural sweeps exist, an example of which is U.S. Pat. No. 6,508,147 (Bruce). Due to the abrasive nature of the soil that sweeps and other ground engaging agricultural devices encounter, such devices become worn and periodically require replacement. Replacement of ground engaging agricultural devices leads to expense and down time while the worn part is replaced.

For the reasons stated above and for other reasons which will become apparent to those skilled in the art upon reading and understanding the specification, there is a need in the art for an improved agricultural device with wear resistant coating.

Thus, it is a primary object of the disclosure to provide an agricultural device with wear resistant coating that prevents wear of the device.

These and other objects, features, or advantages of the present disclosure will become apparent from the specification and claims.

BRIEF SUMMARY OF THE DISCLOSURE

The disclosure relates to an improved agricultural device with wear resistant coating. The disclosure relates to an agricultural sweep with wear resistant coating. The disclosure relates to application of wear resistant coating on the leading edge and other areas of an agricultural device.

DETAILED DESCRIPTION

In the following detailed description of the embodiments, reference is made to the accompanying drawings which form a part hereof, and in which is shown by way of illustration specific preferred embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the present disclosures. The following detailed description is, therefore, not to be taken in a limiting sense, and the scope of the present disclosure is defined only by the appended claims, along with the full scope of equivalents to which such claims are entitled.

As used herein, the terminology such as vertical, horizontal, top, bottom, front, back, end and sides are referenced according to the views presented. It should be understood, however, that the terms are used only for purposes of description, and are not intended to be used as limitations. Accordingly, orientation of an object or a combination of objects may change without departing from the scope of the disclosure.

Figure 1:
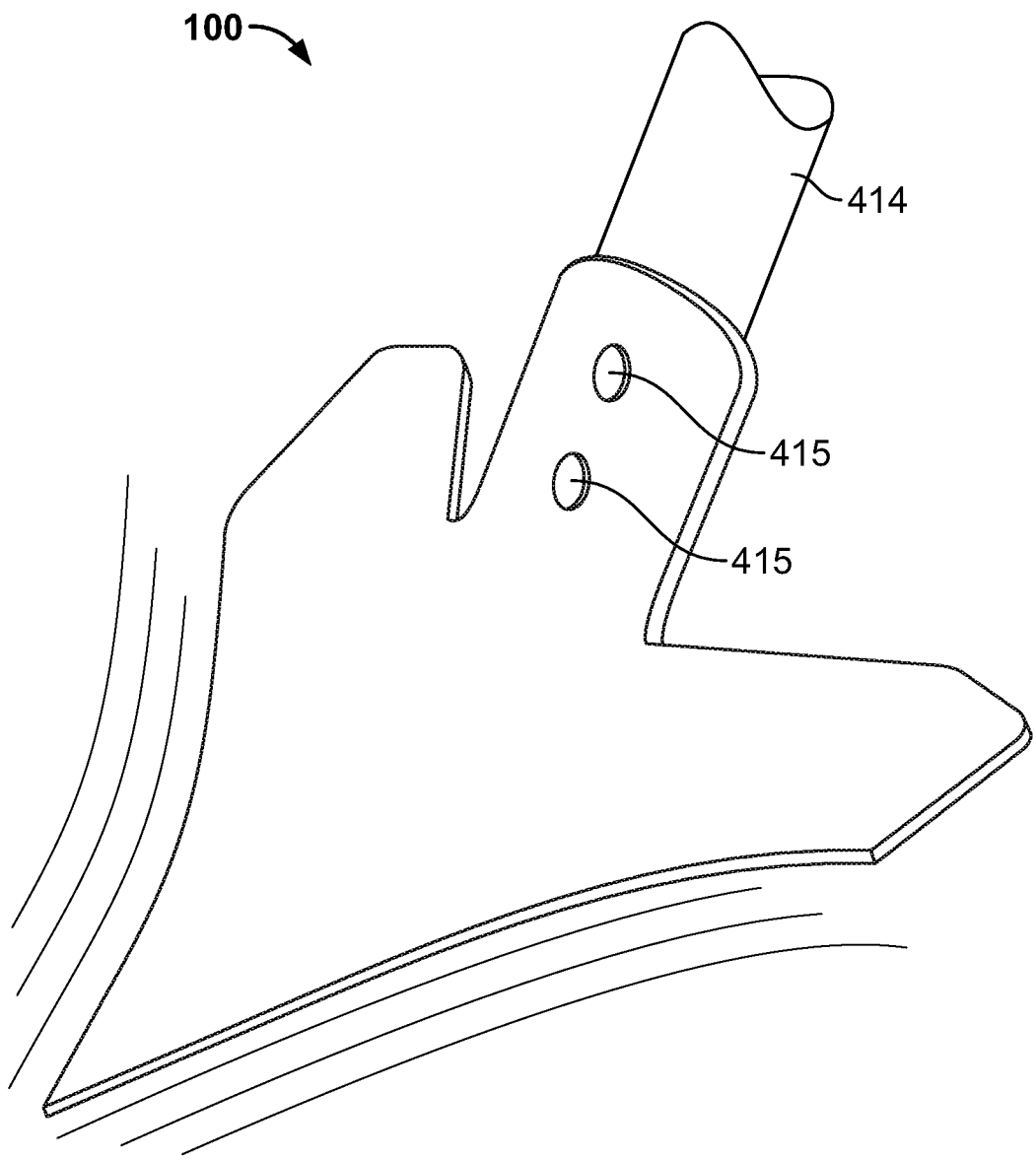
FIG. 1 depicts a perspective view of an agricultural device attached to a shank of an earth working implement moving through soil according to one embodiment.

Throughout the disclosure, agricultural device 100 may be referred to as simply "device 100." As shown in FIGS. 3-14, an example of an agricultural device 100 comprises a shank portion 111 with holes 112 therein for allowing the shank portion 111 to be attached to a shank 414 of an agricultural tillage implement with bolts 415 as shown in FIG. 1. First and second rear wings 116 are connected by an intermediate portion 118.

Figure 2:
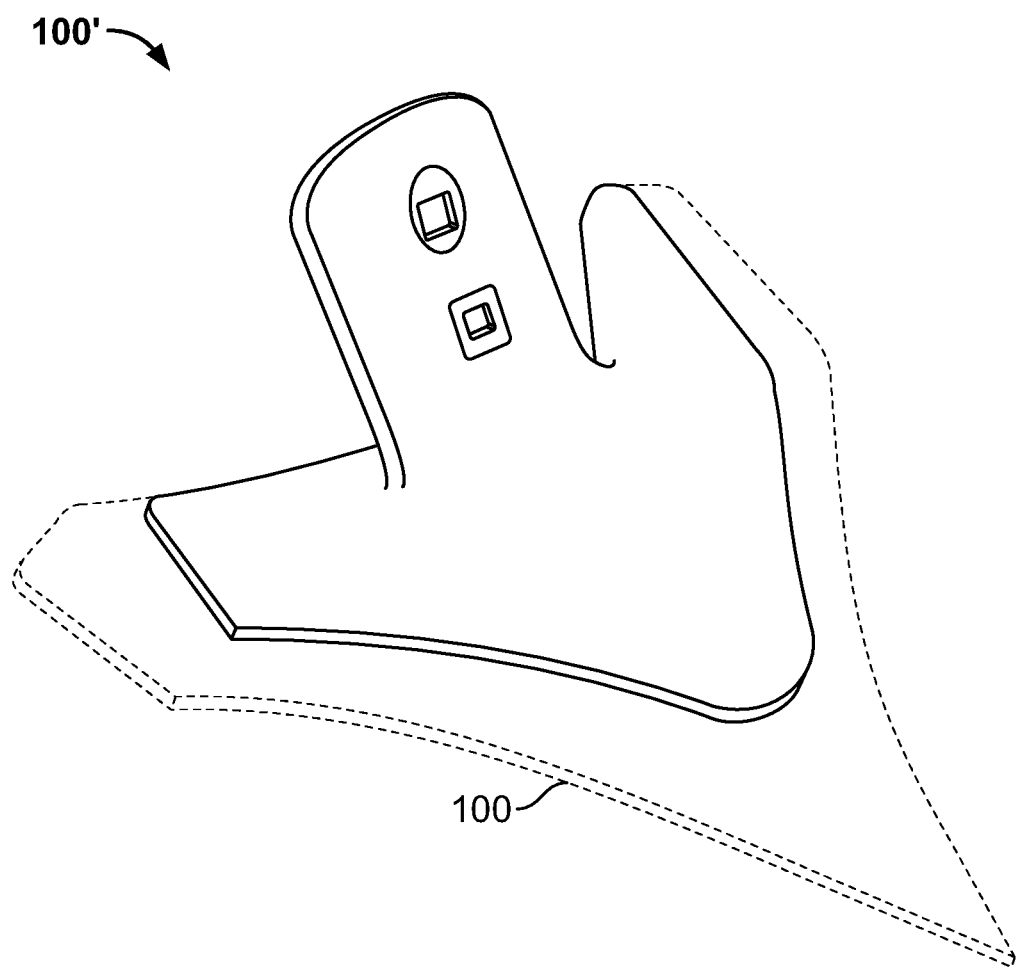
FIG. 2 depicts a perspective view of a typical wear pattern experienced by an agricultural device according to one embodiment.
Figure 3:
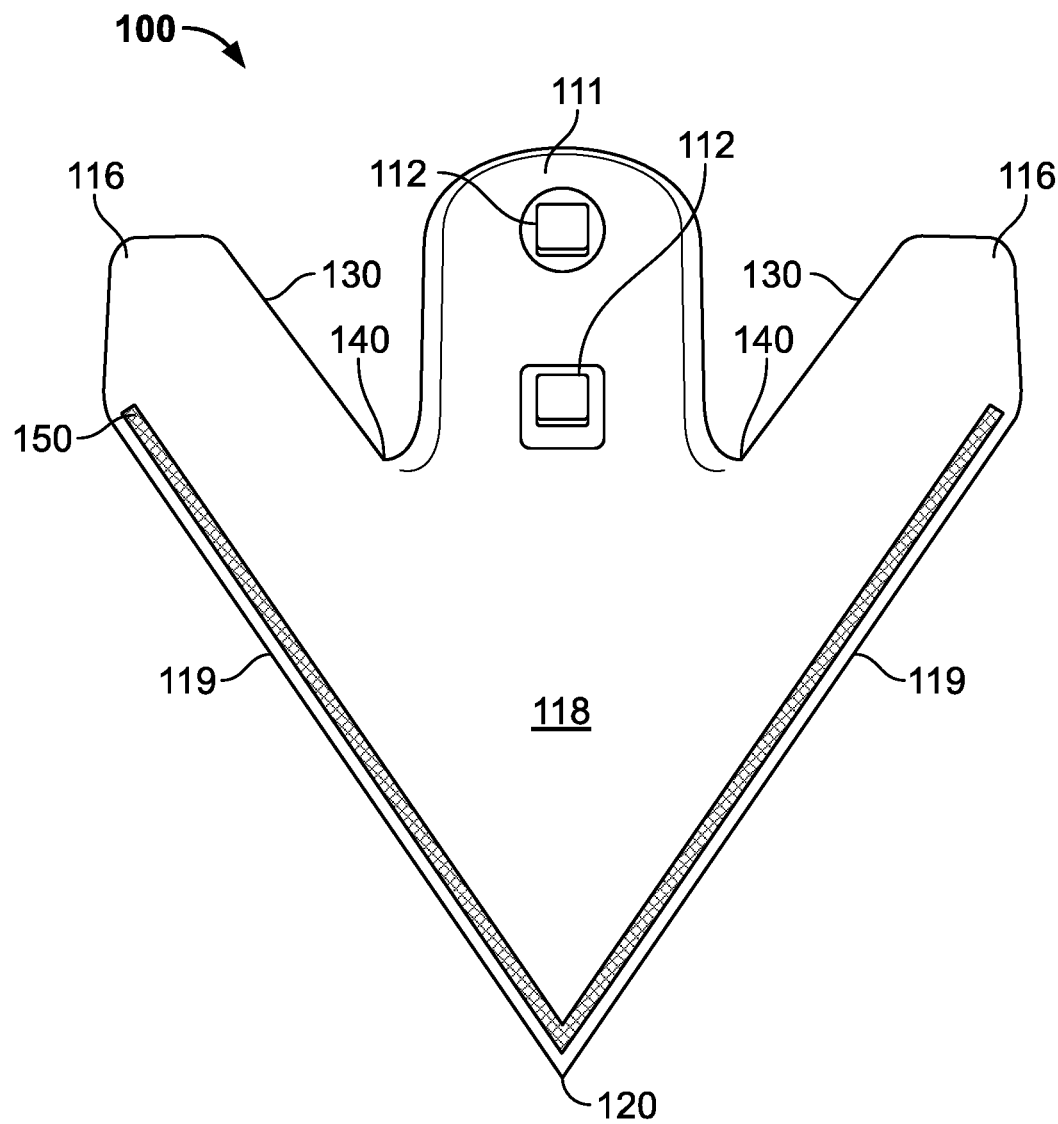
FIG. 3 depicts how wear resistant coating is edge applied to a top side of an agricultural device according to one embodiment.

Edges 119 taper forwardly from a trailing edge 130 to a tip 120. For purpose of this disclosure, tip 120 may be referred to as tip 120 or point 120. The edges 119 and tip 120 together form a portion of device 100 referred to as the leading edge. The points at which the rear wings 116 meet the intermediate portion 118 are referred to as the shoulders 140. Tip 120 may have nominal width (i.e., the lines of edges 119 intersect at the tip 120 forming a point), or tip 120 may form a chisel point which is tapered in thickness from having practically no thickness at the extreme front thereof to a rear portion thereof which is substantially the same thickness as the plate from which the entire sweep is constructed. As shown in FIG. 2, the device 100 gradually wears from the original shape shown in dashed lines to the condition 100' shown in solid lines. The shape of device 100 is substantially similar to the earth working sweep disclosed in U.S. Pat. No. 6,508,147, which is incorporated herein by reference.

The device 100 may be constructed from steel or any other metal or material suitable for use as a ground-engaging device. The device 100 can be as wide or narrow as desired.

As shown in FIG. 1, in operation, soil (depicted as curved lines) first encounters device 100 at tip 120 and edges 119. The soil continues to move across device 100 as device 100 is propelled through the soil, and the soil that travels over the top of device 100 ultimately moves off device 100 at its trailing edge 130. As shown in FIG. 2, the device 100 gradually wears from its original shape 100 shown in dashed lines to the condition 100' shown in solid lines. Wear occurs at the tip 120 and edges 119 as a result of encountering soil, rocks, roots, and other objects.

To extend the useful life of device 100, a wear resistant coating 150 may be applied at tip 120, edges 119, shoulders 140, or any combination of tip 120, edges 119, and shoulders 140. Wear resistant coating 150 may comprise carbide particles, tungsten carbide coating, and the like. However, wear resistant coating 150 may be comprised of any material or composition without departing from the disclosure. The wear resistant coating 150 may be applied to device 100 using any application method. For example, wear resistant coating 150 may be welded, sprayed, rolled, brushed, dabbed, etched, deposited, applied by laser, deposited by plasma or detonation gun, or brushed onto device 100. Alternatively, device 100 may be dipped in wear resistant coating 150.

Wear Resistant Coating 150 on the Leading Edge as Shown in FIGS. 3-14

As shown in FIGS. 3-14, wear resistant coating 150 may be applied to the leading edge of device 100. A line of wear resistant coating 150 may be applied to the tip 120. Additionally, or alternatively, a line of wear resistant coating 150 may be applied to or near edges 119 or a portion of edges 119. Wear resistant coating 150 may be applied to the top, bottom or side of tip 120 and/or edges 119. Wear resistant coating 150 may be applied to the shoulders 140 in addition to the leading edge of device 100, or wear resistant coating 150 may be applied to the leading edge only.

Wear Resistant Coating 150 at the Tip 120 as Shown in FIGS. 4-14

As shown in FIGS. 4-14, wear resistant coating 150 may be applied to the leading edge of device 100. A patch of wear resistant coating 150 may additionally or alternatively be applied to a first location 160 at the tip 120. The patch of wear resistant coating 150 at first location 160 may comprise a triangular, circular, semi-circular, square or any other shaped patch of wear resistant coating 150 that completely or partially covers tip 120. The patch of wear resistant coating 150 may be applied to the top, bottom or side of tip 120. Wear resistant coating 150 may be applied to the shoulders 140 in addition to the leading edge of device 100, or wear resistant coating 150 may be applied to the tip 120 only.

Wear Resistant Coating 150 as Shown in FIGS. 5-10 and 12-14

As shown in FIGS. 5-10 and 12-14, wear resistant coating 150 may be applied at a second location 170 at each shoulder 140. The patches of wear resistant coating 150 may comprise triangular, circular, semi-circular, square or any other shaped patches of wear resistant coating 150 that completely or partially cover shoulders 140. The patches of wear resistant coating 150 may be applied to the top, bottom or side of shoulders 140. Wear resistant coating 150 may be applied to the leading edge or tip 120 in addition to the shoulders 140, or wear resistant coating 150 may be applied to the shoulders 140 only.

In an embodiment of the invention, a wear resistant agricultural device 100 comprises a shank portion 111 configured for attachment to a tillage implement; a first rear wing 116 and a second rear wing 116, wherein the first and second rear wings 116 are connected to an intermediate portion 118 and an end of the intermediate portion 118 connects to the shank portion 111, thereby forming a first shoulder 140 where the first rear wing 116 meets the intermediate portion 118 and a second shoulder 140 where the second rear wing 116 meets the intermediate portion 118; a first edge 119 tapering forwardly from the first rear wing 116 to a point 120; a second edge 119 tapering forwardly from the second rear wing 116 to the point 120; and a patch of wear resistant coating 150 applied at each of the first and second shoulders 116. In this embodiment, a patch of wear resistant coating 150 may be applied at the point 120 and the first and second edges 119 are uncoated. Alternatively, or additionally, the wear resistant agricultural device 100 may comprise a wear resistant coating 150 applied to each of the first and second edges 119 and the point 120.

Wear Resistant Coating 150 Patterns Based on Soil Type as Shown in FIGS. 3-14

Agricultural soil type varies from location to location, and soil type affects the wear pattern agricultural device 100 experiences. Wear resistant coating 150 may be applied in differing patterns based on soil type as shown in FIGS. 3-14. The shape of each patch of wear resistant coating 150 directs the wear pattern that will be experienced by device 100.

A first patch of wear resistant coating 150 may be applied in a soil-specific pattern to a first location 160 on the top side of agricultural device 100 at or near tip 120. A second patch of wear resistant coating 150 may be applied in a soil-specific pattern to a second location 170 on the top side of agricultural device 100 at or near each shoulder 140. A third patch of wear resistant coating 150 may be applied in a soil-specific pattern to a third location 180 on the top side of agricultural device 100 at or near the shank portion 111. Patches of wear resistant coating 150 may be applied to any combination or subset of the first location 160, second location 170, and third location 180 or may be applied to any other location on the surface of the device 100 without departing from the scope of the disclosure. Patches of wear resistant coating 150 may be applied one inch or less from the location where wear starts. Wear resistant coating 150 may be applied in any thickness without departing from the scope of the disclosure.

Figure 10:
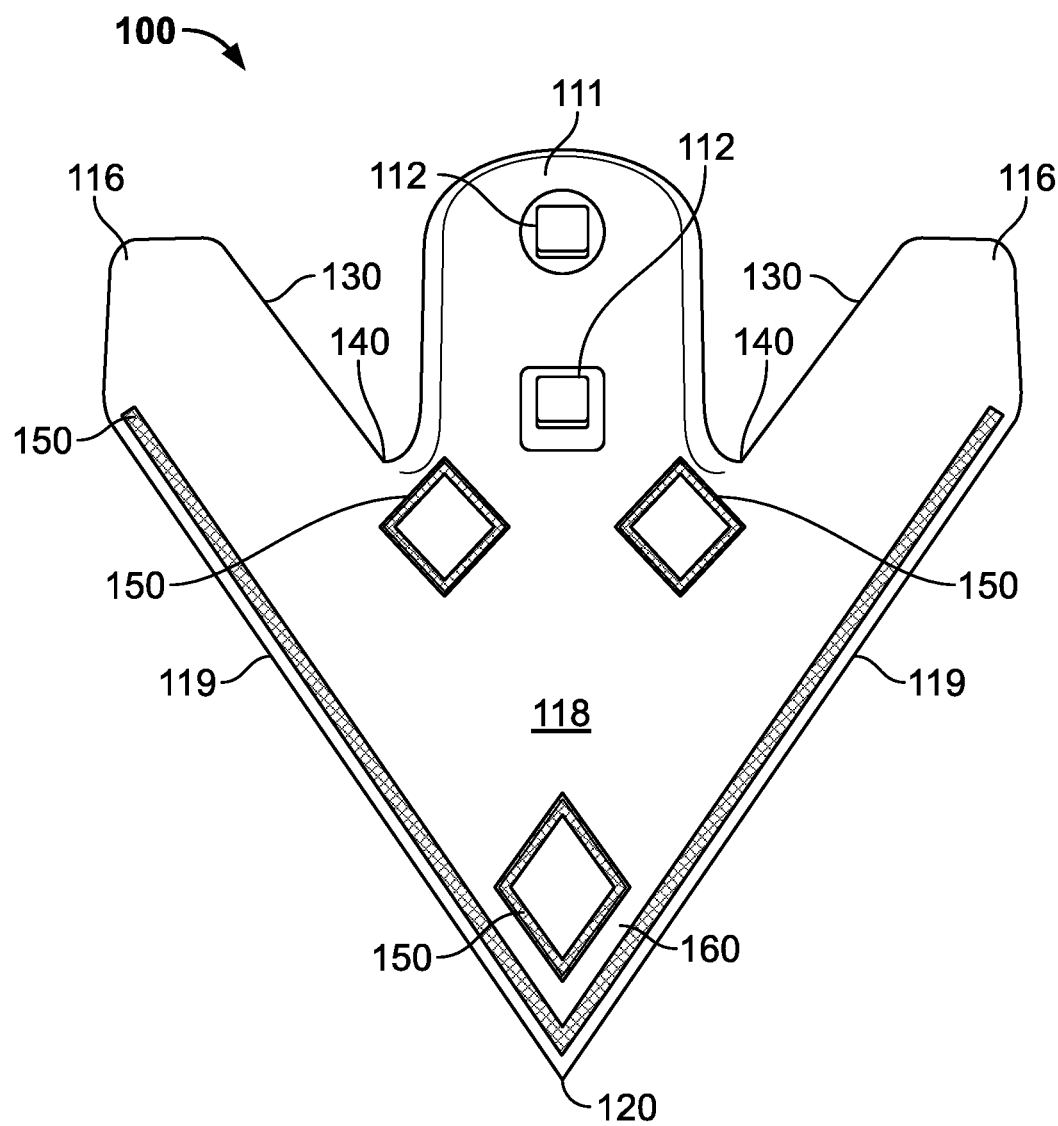
FIG. 10 depicts a top view of an agricultural device with wear coating according to one embodiment.
Figure 14:
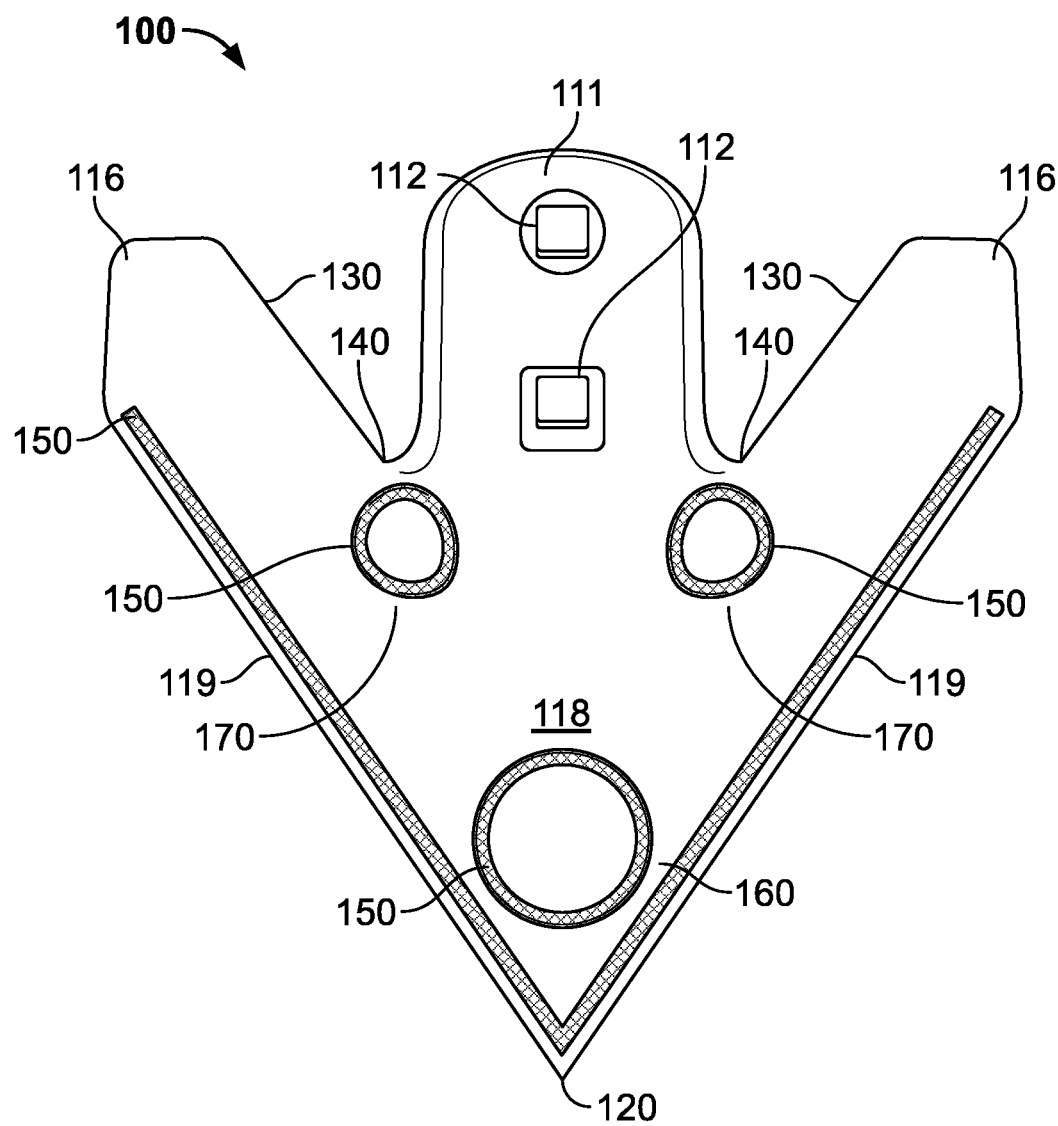
FIG. 14 depicts a top view of an agricultural device with wear coating according to one embodiment.

Patches of wear resistant coating 150 may be solid, filled in shapes or open, unfilled shapes. Further, patches of wear resistant coating 150 may be closed shapes in which the entire perimeter of the shape is applied as shown in FIGS. 8, 10, and 14, or patches of wear resistant coating 150 may be open shapes in which a portion of the perimeter of the shape is omitted as shown in FIGS. 4-7 and 11-12. Any combination of filled in, unfilled, open, and closed shapes may be used without departing from the scope of the disclosure.

Soil types are highly variable. In particular, there are many types of sandy or abrasive soils, each of which may produce a unique wear pattern. It is anticipated that some equipment owners may experience different wear patterns based on their specific soil, and the shapes, dimensions, and locations of wear resistant coating 150 may be customized to counter specific wear patterns. Further, shapes, dimensions, locations, and thicknesses of wear resistant coating 150 may be customized to achieve an acceptable balance of wear resistant properties and manufacturing cost for a particular customer. Customers may submit worn agricultural devices 100 to the manufacturer for analysis of wear patterns, and subsequent agricultural devices 100 produced for that individual customer will have customized wear resistant coating 150 patterns that are most effective for the customer's specific soil type.

In an embodiment of the invention, a wear resistant agricultural device 100 comprises a shank portion 111 configured for attachment to a tillage implement; a first rear wing 116 and a second rear wing 116, wherein the first and second rear wings 116 are connected to an intermediate portion 118 and an end of the intermediate portion 118 connects to the shank portion 111, thereby forming a first shoulder 140 where the first rear wing 116 meets the intermediate portion 118 and a second shoulder 140 where the second rear wing 116 meets the intermediate portion 118; a first edge 119 tapering forwardly from the first rear wing 116 to a tip 120; a second edge 119 tapering forwardly from the second rear wing 116 to the tip 120; and a pattern of wear resistant coating 150 applied on a top side of the agricultural device 100 at a first location 160 at or near the tip 120 and a second location 170 at or near each of the first and second shoulders 140, wherein the pattern of wear resistant coating 150 is configured to protect the agricultural device 100 from a particular soil type.

Figure 4:
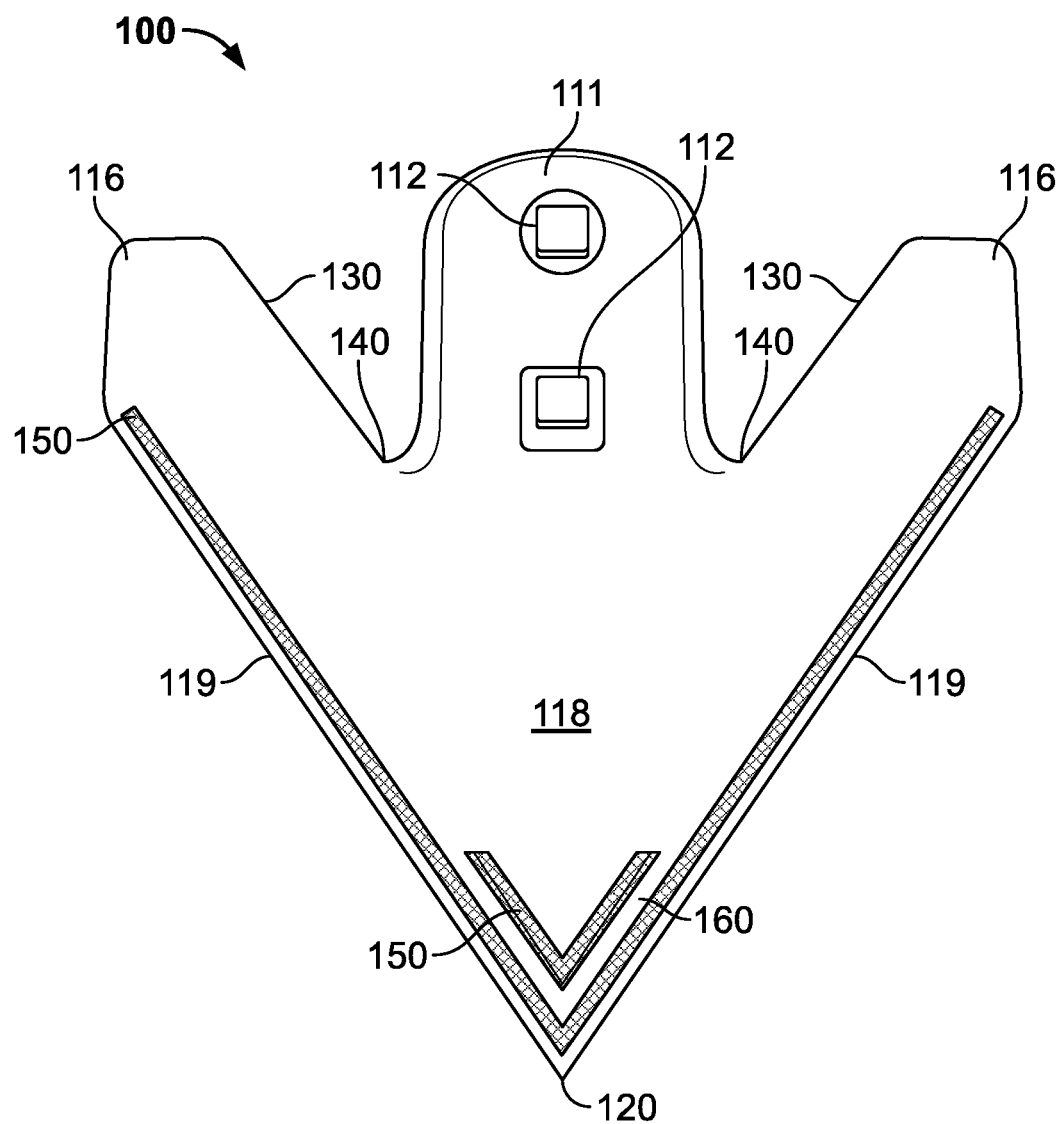
FIG. 4 depicts a top view of an agricultural device with wear coating according to one embodiment.

As shown in FIG. 4, an open triangle or "v" shaped patch of wear resistant coating 150 may be applied at a first position 160 on the top side of an agricultural device 100. A line of wear resistant coating 150 may also be applied along all or part of the leading edge of agricultural device 100.

Figure 5:
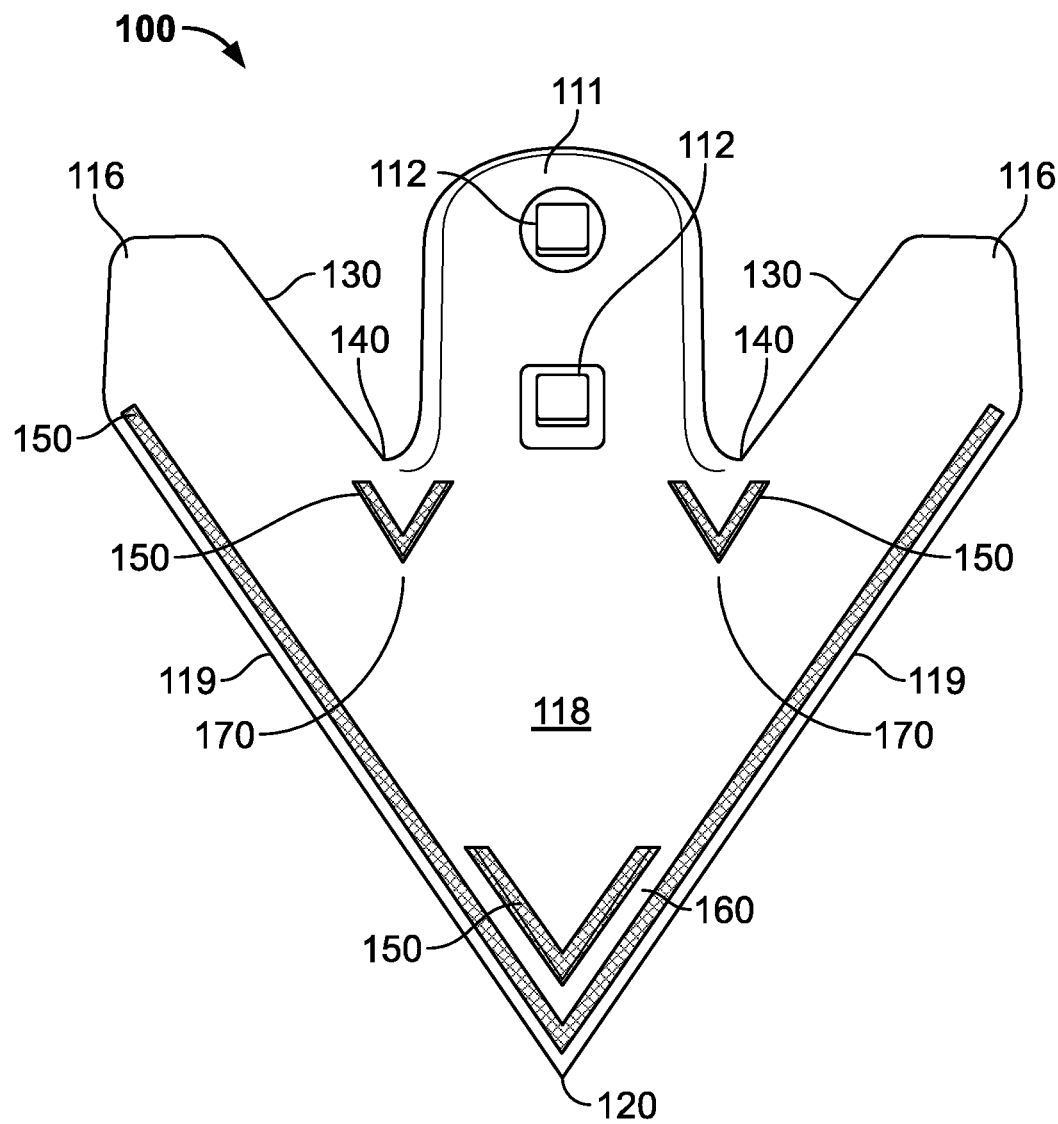
FIG. 5 depicts a top view of an agricultural device with wear coating according to one embodiment.

As shown in FIG. 5, an open triangle or "v" shaped patch of wear resistant coating 150 may be applied at a first position 160 on the top side of an agricultural device 100. Additional open triangle or "v" shaped patches of wear resistant coating 150 may also be applied at each second position 170. A line of wear resistant coating 150 may also be applied along all or part of the leading edge of agricultural device 100.

Figure 6:
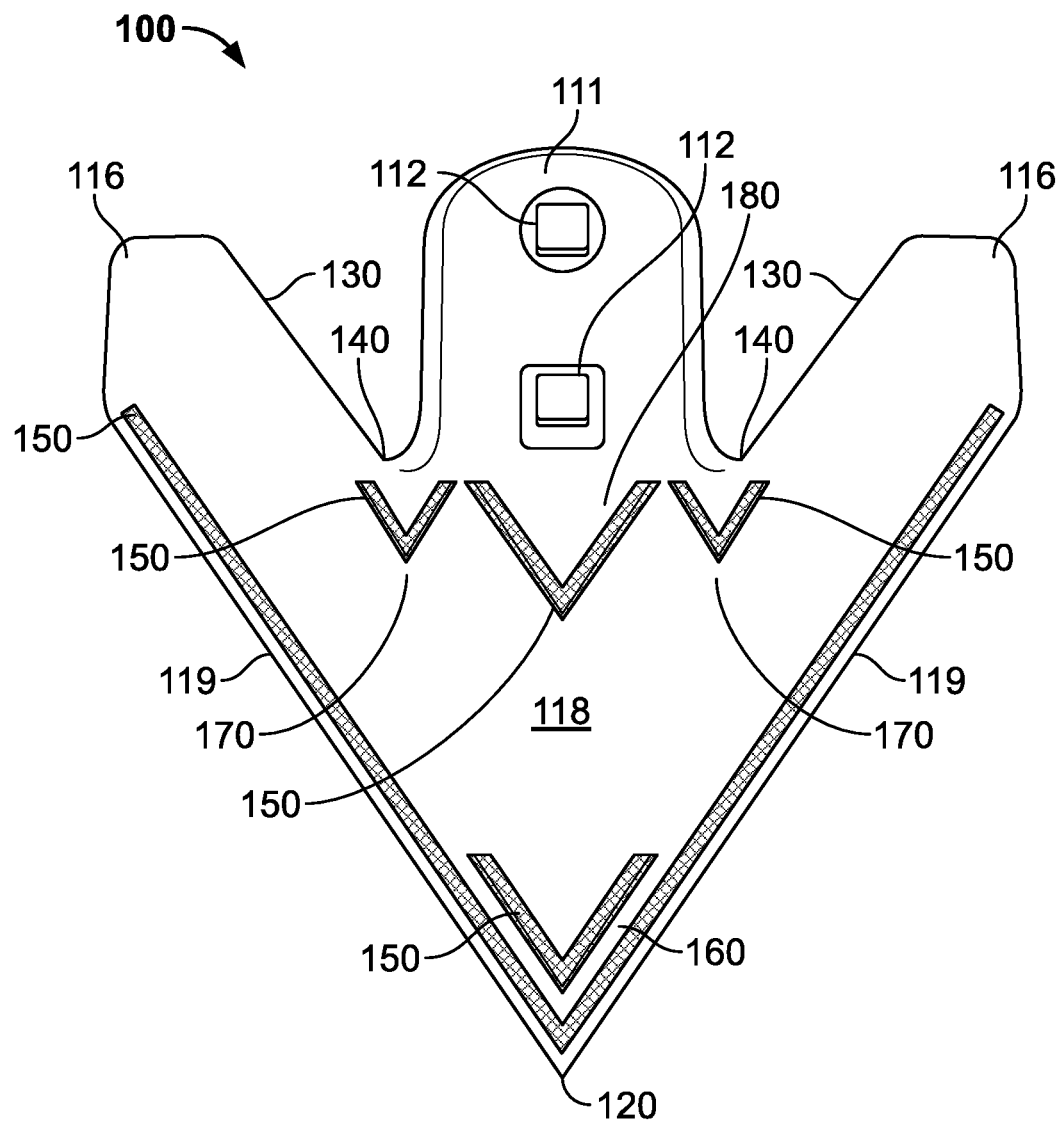
FIG. 6 depicts a top view of an agricultural device with wear coating according to one embodiment.

As shown in FIG. 6, an open triangle or "v" shaped patch of wear resistant coating 150 may be applied at a first position 160 on the top side of an agricultural device 100. Additional open triangle or "v" shaped patches of wear resistant coating 150 may also be applied at each second position 170. An additional open triangle or "v" shaped patch of wear resistant coating 150 may also be applied at a third position 180. A line of wear resistant coating 150 may also be applied along all or part of the leading edge of agricultural device 100.

Figure 7:
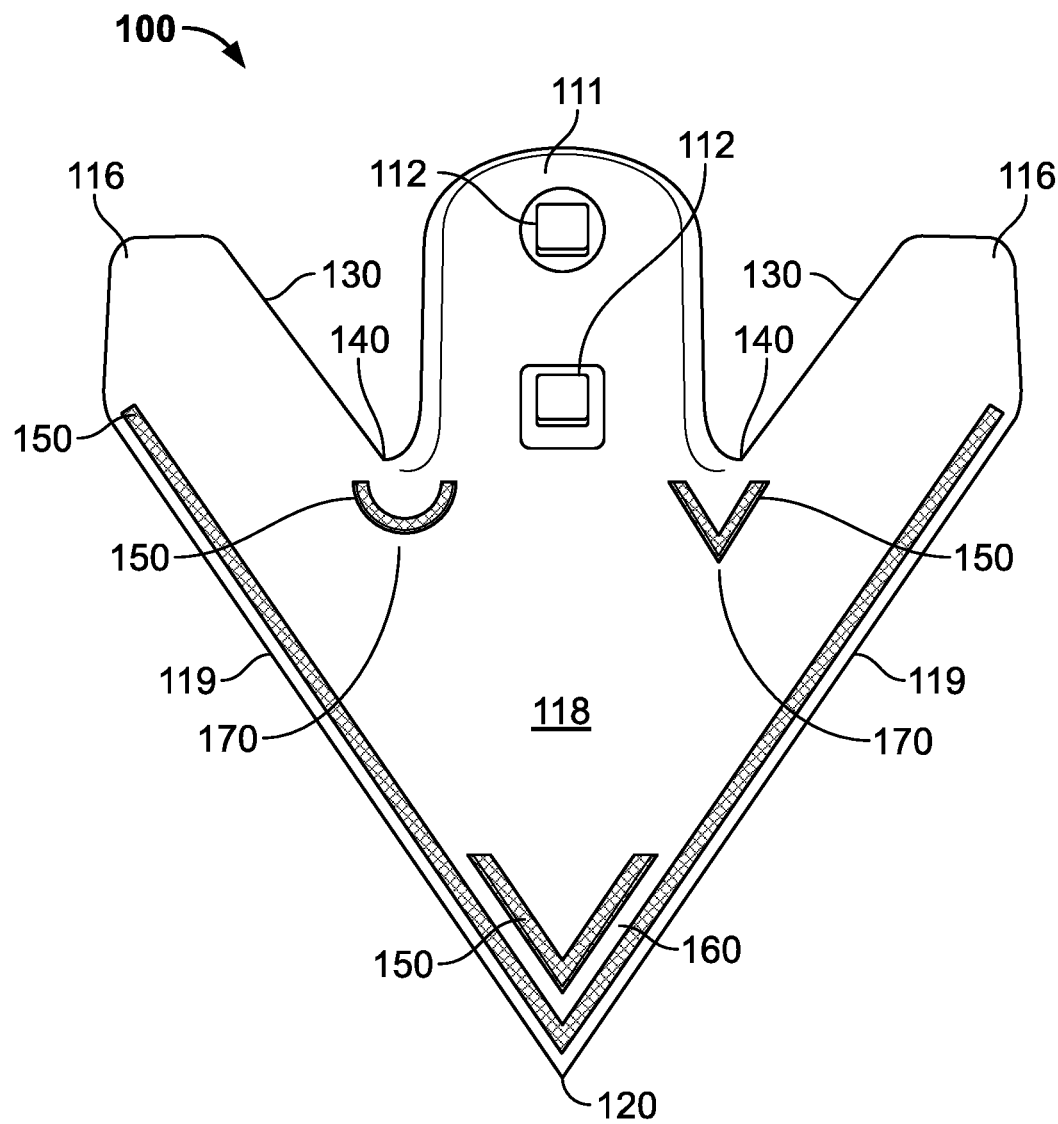
FIG. 7 depicts a top view of an agricultural device with wear coating according to one embodiment.
Figure 8:
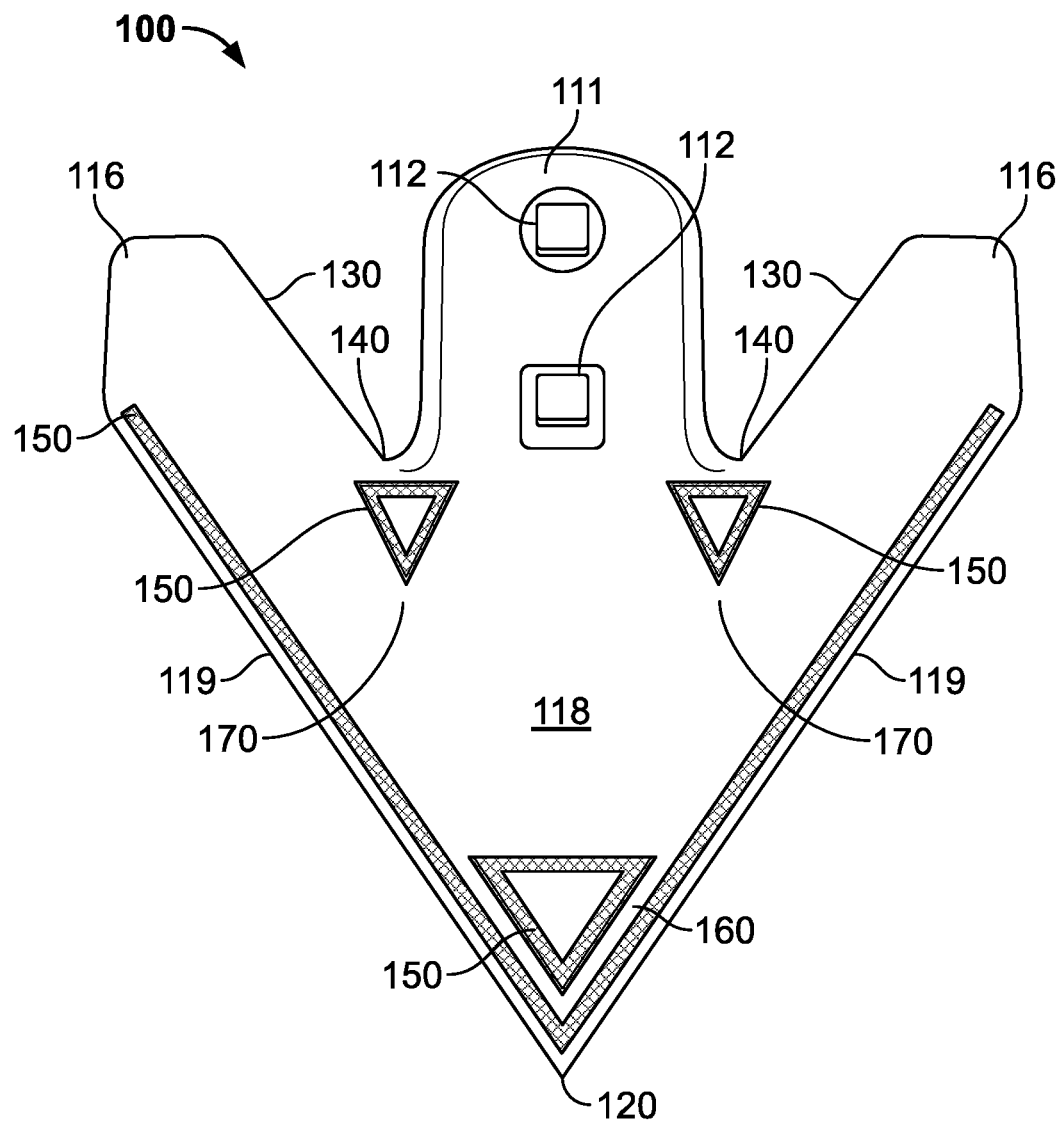
FIG. 8 depicts a top view of an agricultural device with wear coating according to one embodiment.

As shown in FIG. 7, an open triangle or "v" shaped patch of wear resistant coating 150 may be applied at a first position 160 on the top side of an agricultural device 100. An additional open triangle or "v" shaped patch of wear resistant coating 150 may also be applied at a second position 170 near one shoulder 140, and an open semicircle shaped patch of wear resistant coating 150 may be applied at a second position 170 near the other shoulder 140. A line of wear resistant coating 150 may also be applied along all or part of the leading edge of agricultural device 100.

As shown in FIG. 8, a closed triangle shaped patch of wear resistant coating 150 may be applied at a first position 160 on the top side of an agricultural device 100. Additional closed triangle shaped patches of wear resistant coating 150 may also be applied at each second position 170. A line of wear resistant coating 150 may also be applied along all or part of the leading edge of agricultural device 100.

Figure 9:
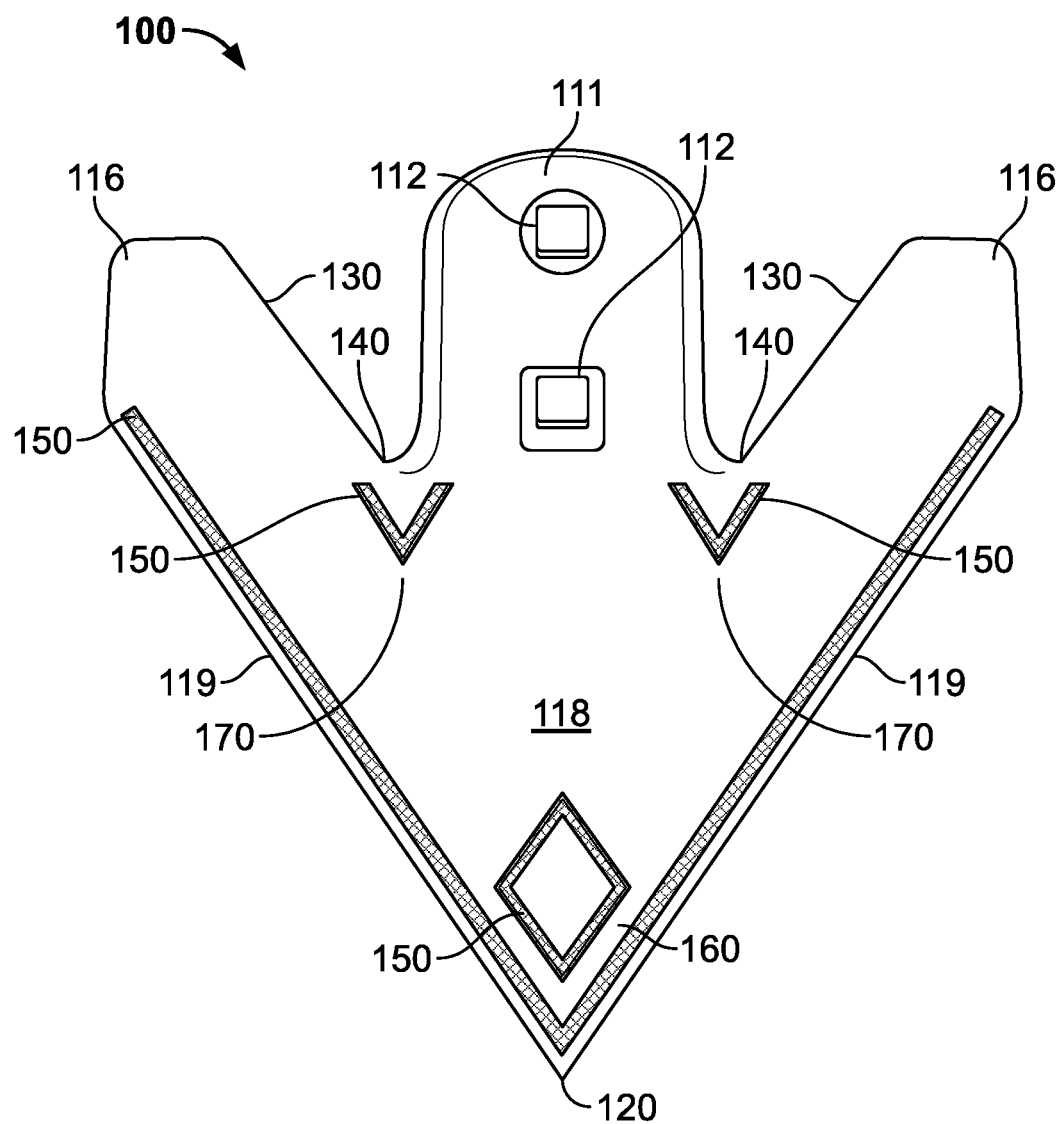
FIG. 9 depicts a top view of an agricultural device with wear coating according to one embodiment.

As shown in FIG. 9, a closed diamond shaped patch of wear resistant coating 150 may be applied at a first position 160 on the top side of an agricultural device 100. Additionally, open triangle or "v" shaped patches of wear resistant coating 150 may also be applied at each second position 170. A line of wear resistant coating 150 may also be applied along all or part of the leading edge of agricultural device 100.

As shown in FIG. 10, a closed square, box, or diamond shaped patch of wear resistant coating 150 may be applied at a first position 160 on the top side of an agricultural device 100. Additional closed square, box, or diamond shaped patches of wear resistant coating 150 may also be applied at each second position 170. A line of wear resistant coating 150 may also be applied along all or part of the leading edge of agricultural device 100.

Figure 11:
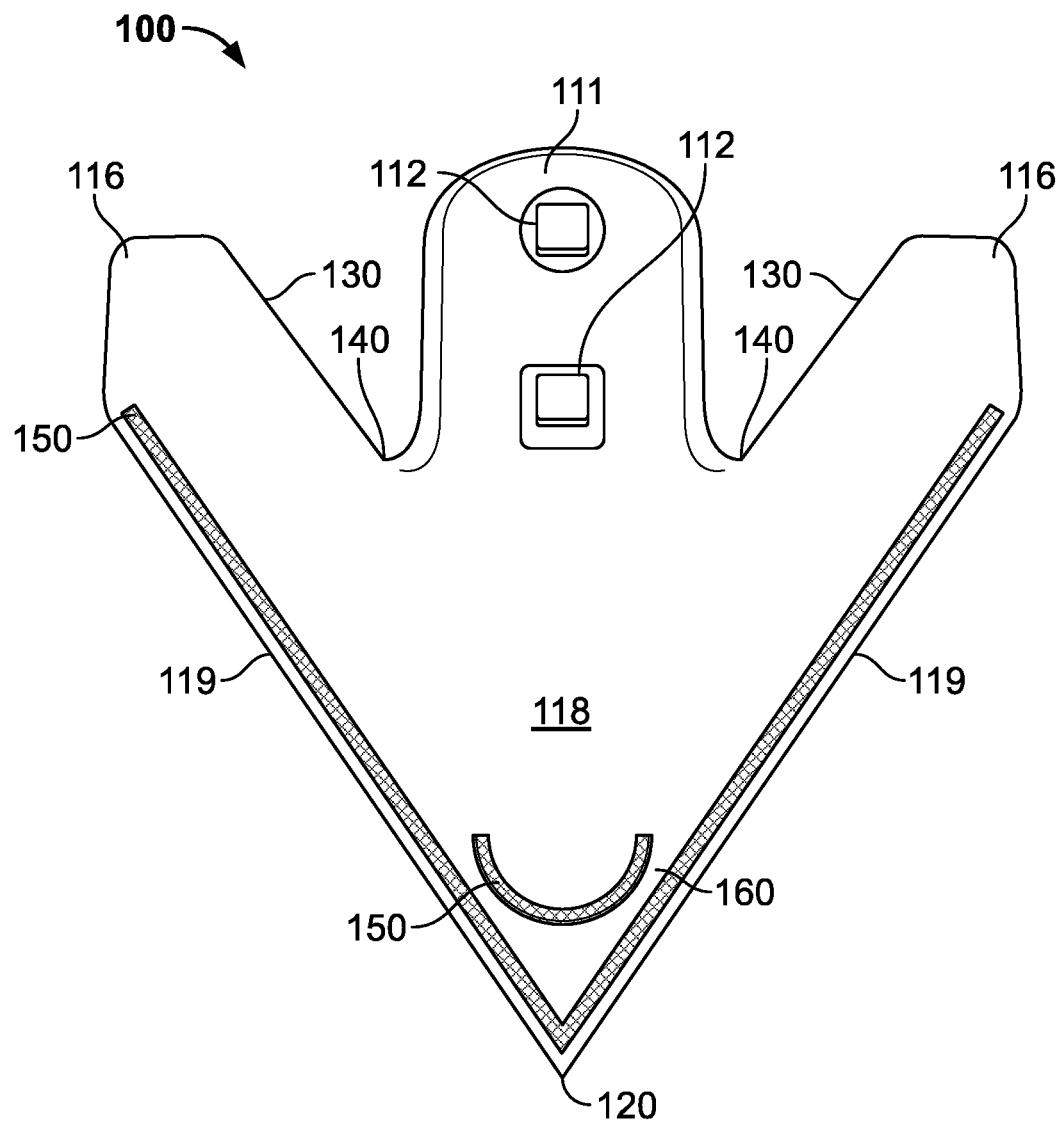
FIG. 11 depicts a top view of an agricultural device with wear coating according to one embodiment.

As shown in FIG. 11, an open semicircle shaped patch of wear resistant coating 150 may be applied at a first position 160 on the top side of an agricultural device 100. A line of wear resistant coating 150 may also be applied along all or part of the leading edge of agricultural device 100.

Figure 12:
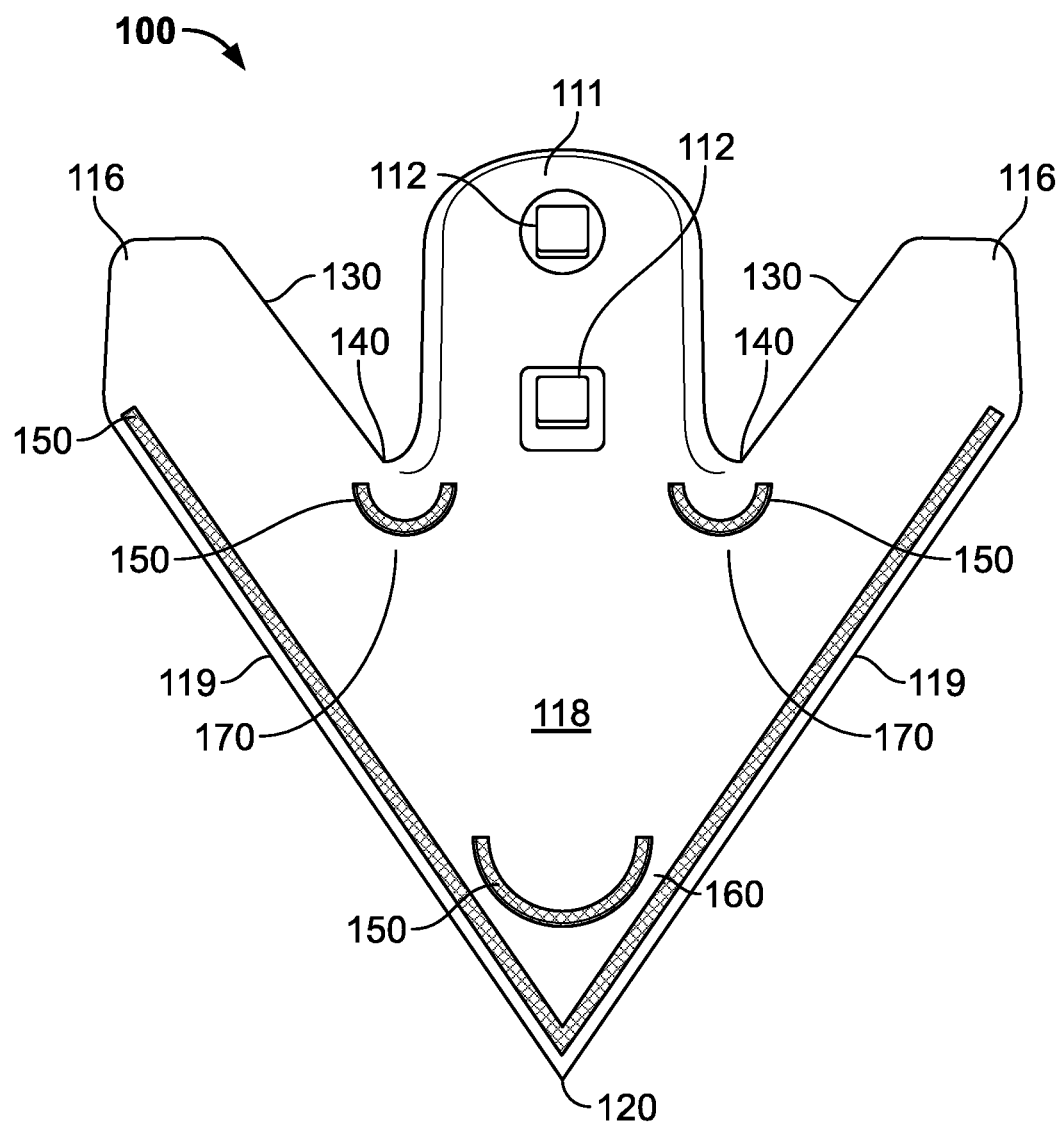
FIG. 12 depicts a top view of an agricultural device with wear coating according to one embodiment.

As shown in FIG. 12, an open semicircle shaped patch of wear resistant coating 150 may be applied at a first position 160 on the top side of an agricultural device 100. Additional open semicircle shaped patches of wear resistant coating 150 may also be applied at each second position 170. A line of wear resistant coating 150 may also be applied along all or part of the leading edge of agricultural device 100.

Figure 13:
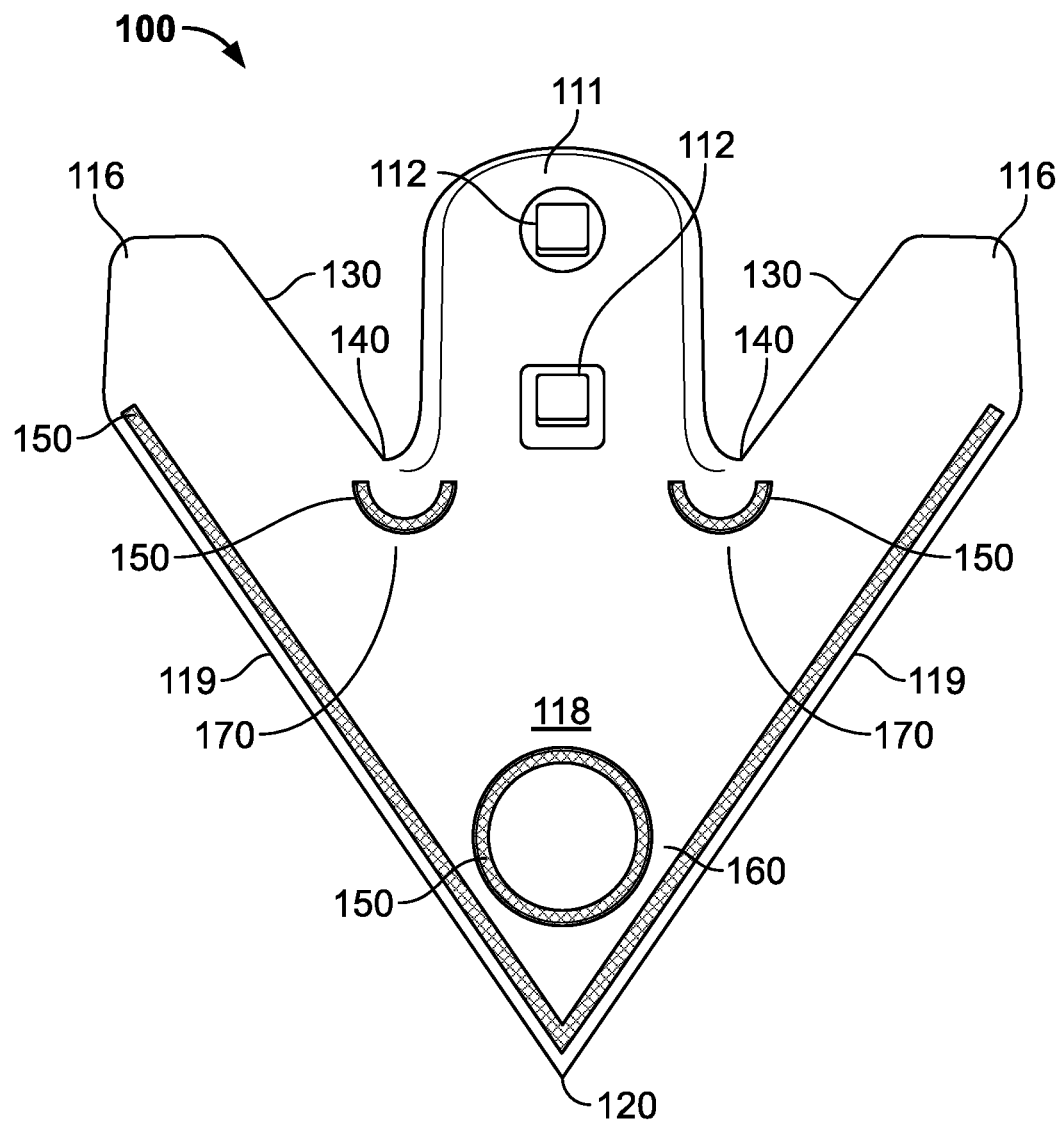
FIG. 13 depicts a top view of an agricultural device with wear coating according to one embodiment.

As shown in FIG. 13, a closed circle shaped patch of wear resistant coating 150 may be applied at a first position 160 on the top side of an agricultural device 100. Additionally, open semicircle shaped patches of wear resistant coating 150 may be applied at each second position 170. A line of wear resistant coating 150 may also be applied along all or part of the leading edge of agricultural device 100.

As shown in FIG. 14, a closed circle shaped patch of wear resistant coating 150 may be applied at a first position 160 on the top side of an agricultural device 100. Additional closed circle shaped patches of wear resistant coating 150 may be applied at each second position 170. A line of wear resistant coating 150 may also be applied along all or part of the leading edge of agricultural device 100.

Lines of wear resistant coating 150 may be applied at or near the edges 119 on the bottom side of agricultural device 100. The lines of wear resistant coating 150 may extend along the entirety of each edge 119 from the tip 120 to the rear wings 116, or the lines of wear resistant coating 150 may be applied at or near only a portion of each edge 119.

Each patch of wear resistant coating 150 may be applied as shown in FIGS. 3-14; alternatively any patch of wear resistant coating 150 may be rotated by 90 to 180 degrees. Further, it is envisioned that patches of wear resistant coating 150 will be applied to the first location 160, second location 170, and third location 180 on the top side of agricultural device 100 and a line of wear resistant coating 150 applied to each edge 119 on the bottom side of agricultural device 100 as shown and previously described; however, the patches of wear resistant coating 150 may alternatively be applied to a location corresponding to the first location 160, a location corresponding to the second location 170, and a location corresponding to the third location 180 on the bottom side of agricultural device 100 and a line of wear resistant coating 150 applied to each edge 119 on the top side of agricultural device 100 without departing from the scope of the disclosure.

The agricultural device 100 with wear resistant coating 150 has many benefits and advantages including, but not limited to reducing the expense and lost working time associated with replacing worn ground engaging components. These and other benefits and advantages of the agricultural device 100 are apparent from the specification and claims.

REFERENCE NUMERALS

100—agricultural device, also called device
100'—a worn condition of agricultural device 100
111—shank portion
112—hole in shank portion 111
116—rear wing
118—intermediate portion
119—edges
120—tip or point
130—trailing edge
140—shoulders
150—wear resistant coating
160—first location
170—second location
180—third location
414—shank
415—bolt

What is claimed:

1. A wear resistant agricultural device comprising:
a shank portion configured for attachment to a tillage implement;
a first rear wing and a second rear wing, wherein the first and second rear wings are connected to an intermediate portion and an end of the intermediate portion connects to the shank portion, thereby forming a first shoulder where the first rear wing meets the intermediate portion and a second shoulder where the second rear wing meets the intermediate portion;
a first edge tapering forwardly from the first rear wing to a point;
a second edge tapering forwardly from the second rear wing to the point;
a first patch of wear resistant coating applied at the first shoulder; and
a second patch of wear resistant coating separate from the first patch of wear resistant coating, the second patch of wear resistant coating applied at the second shoulder.

2. The wear resistant agricultural device of claim 1 wherein a third patch of wear resistant coating is applied at the point and the first and second edges are uncoated.

3. The wear resistant agricultural device of claim 1 further comprising a wear resistant coating applied to each of the first and second edges and the point.

4. The wear resistant agricultural device of claim 1 wherein the wear resistant coating comprises carbide particles.

5. The wear resistant agricultural device of claim 1 wherein the first and the second patches of wear resistant coating each comprise a shape with a closed perimeter.

6. The wear resistant agricultural device of claim 1 wherein the first and the second patches of wear resistant coating each comprise a perimeter comprising an opening facing away from the point.

7. A wear resistant agricultural device comprising:
a shank portion configured for attachment to a tillage implement;
a first rear wing and a second rear wing, wherein the first and second rear wings are connected to an intermediate portion and an end of the intermediate portion connects to the shank portion, thereby forming a first shoulder where the first rear wing meets the intermediate portion and a second shoulder where the second rear wing meets the intermediate portion;
a first edge tapering forwardly from the first rear wing to a tip;
a second edge tapering forwardly from the second rear wing to the tip; and
a pattern of wear resistant coating applied on a top side of the agricultural device, the pattern comprising a first patch of wear resistant coating at or near the tip, a second patch of wear resistant coating at or near the first shoulder, and a third patch of wear resistant coating separate from the second patch of wear resistant coating, the third patch of wear resistant coating at or near the second shoulder, wherein the pattern of wear resistant coating is configured to protect the agricultural device from a particular soil type.

8. The wear resistant agricultural device of claim 7 wherein the first patch of wear resistant coating comprises a generally triangular shape and the second and third patches of wear resistant coating each comprise a generally square shape.

9. The wear resistant agricultural device of claim 7 wherein the first patch of wear resistant coating comprises a generally square shape and the second and third patches of wear resistant coating each comprise a generally rectangular shape.

10. The wear resistant agricultural device of claim 7 wherein the first patch of wear resistant coating comprises a generally rectangular shape and the second and third patches of wear resistant coating each comprise a generally rectangular shape.

11. The wear resistant agricultural device of claim 7 wherein the pattern of wear resistant coating further comprises a generally circular patch of wear resistant coating applied at or near the shank portion separate from the second and third patches of wear resistant coating.

12. The wear resistant agricultural device of claim 7 further comprising a line of wear resistant coating applied to at least a portion of the first and second edges on a bottom side of the agricultural device.

13. The wear resistant agricultural device of claim 7 further comprising wear resistant coating applied to the first edge and the second edge.

14. The wear resistant agricultural device of claim 7 wherein the second and the third patches of wear resistant coating each comprise a shape with a closed perimeter.

15. A wear resistant agricultural device comprising:
a shank portion configured for attachment to a tillage implement;
an intermediate portion connected to the shank portion;
a first wing connected to the intermediate portion;
a first shoulder formed where the first wing meets the intermediate portion;
a second wing connected to the intermediate portion;
a second shoulder formed where the second wing meets the intermediate portion;
a first edge extending from the first wing to a point;
a second edge extending from the second wing to the point;

wear resistant coating applied to the first edge and the second edge;
a first patch of wear resistant coating applied at the first shoulder; and
a second patch of wear resistant coating separate from the first patch of wear resistant coating, the second patch of wear resistant coating applied at the second shoulder.

16. The wear resistant agricultural device of claim 15 further comprising a third patch of wear resistant coating at or near the point.

17. The wear resistant agricultural device of claim 16 wherein the first and the second patches of wear resistant coating each comprise a first shape and the third patch of wear resistant coating comprises a second shape different than the first shape.

18. The wear resistant agricultural device of claim 15 wherein the first and the second patches of wear resistant coating each comprise a shape with a closed perimeter.

19. The wear resistant agricultural device of claim 18 wherein the shape of each of the first and the second patches of wear resistant coating comprises an unfilled interior.

20. The wear resistant agricultural device of claim 15 wherein the first and the second patches of wear resistant coating each comprise a perimeter comprising an opening facing away from the point.

\* \* \* \* \*